US009965635B2

(12) United States Patent
Takahashi et al.

(10) Patent No.: US 9,965,635 B2
(45) Date of Patent: May 8, 2018

(54) IMAGE TAGGING DEVICE

(71) Applicant: Panasonic Intellectual Property Corporation of America, Torrance, CA (US)

(72) Inventors: Masaki Takahashi, Osaka (JP); Sotaro Tsukizawa, Osaka (JP); Yasunori Ishii, Osaka (JP); Reiko Hagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 180 days.

(21) Appl. No.: 15/131,946

(22) Filed: Apr. 18, 2016

(65) Prior Publication Data
US 2016/0314306 A1 Oct. 27, 2016

(30) Foreign Application Priority Data

Apr. 24, 2015 (JP) .................................. 2015-089758
Jan. 29, 2016 (JP) .................................. 2016-016702

(51) Int. Cl.
*G06F 21/00* (2013.01)
*G06F 21/60* (2013.01)
*G06N 3/08* (2006.01)
*G06K 9/00* (2006.01)
*G06F 21/62* (2013.01)

(52) U.S. Cl.
CPC ........ *G06F 21/602* (2013.01); *G06F 21/6254* (2013.01); *G06K 9/00228* (2013.01); *G06K 9/00664* (2013.01); *G06N 3/08* (2013.01)

(58) Field of Classification Search
CPC .......................... G06F 21/6254; G06F 21/602
See application file for complete search history.

(56) References Cited

U.S. PATENT DOCUMENTS 5,617,119 A * 4/1997 Briggs ................ G06F 17/3025
358/1.1
7,110,026 B2 * 9/2006 Feldis, III ............ G11B 27/105
348/207.1

(Continued)

FOREIGN PATENT DOCUMENTS

JP  2007-213181  8/2007

*Primary Examiner* — Ali Shayanfar
(74) *Attorney, Agent, or Firm* — Greenblum & Bernstein, P.L.C.

(57) ABSTRACT

Provided is an image tagging device including: a first functional unit in which an image including an object that is a target of privacy protection is stored and that removes privacy information by changing part of the master image; a second functional unit that acquires the changed image from the first functional unit and changes a region image of an object that is not to be tagged in the first image; a function that distributes the changed image from the second functional unit to a tagging operation terminal device and receives image tag information from the tagging operation terminal device over a network; and a tagged image generator that generates a tagged image on the basis of the master image and the image tag information. This makes it possible to collect tagged images while achieving both privacy protection and an improvement in efficiency of a tagging operation.

19 Claims, 17 Drawing Sheets

(56) References Cited

U.S. PATENT DOCUMENTS

| | | | |
|---|---|---|---|
| 8,401,334 B2* | 3/2013 | Neville | G06K 9/00221 |
| | | | 382/284 |
| 2002/0003963 A1* | 1/2002 | Ohkubo | G03B 17/48 |
| | | | 396/429 |
| 2002/0053024 A1* | 5/2002 | Hashimoto | G06F 21/125 |
| | | | 713/168 |
| 2007/0078674 A1* | 4/2007 | Weinberg | G06F 19/321 |
| | | | 715/817 |
| 2007/0109322 A1* | 5/2007 | Miyata | G06F 3/1208 |
| | | | 345/619 |
| 2011/0085035 A1* | 4/2011 | Choi | H04N 1/448 |
| | | | 348/143 |
| 2012/0321143 A1* | 12/2012 | Krupka | G06K 9/00221 |
| | | | 382/118 |
| 2013/0332485 A1* | 12/2013 | Ennis | G06F 17/30283 |
| | | | 707/770 |
| 2015/0178318 A1* | 6/2015 | Lee | H04N 1/2116 |
| | | | 348/231.3 |
| 2015/0261787 A1* | 9/2015 | Hu | G06F 17/30247 |
| | | | 382/118 |
| 2016/0063268 A1* | 3/2016 | Cheatham, III | G06F 21/10 |
| | | | 726/28 |

* cited by examiner

| | | |
|---|---|---|
| 702 | SCENE ID | 123450 |
| 703 | CUTOUT INFORMATION | T180, B0, L0, R0 |

701

| TAG ID | SUPER CLASS: ROAD SIGN, CLASS: CROSSWALK |
|---|---|
| IMAGE DATA | |

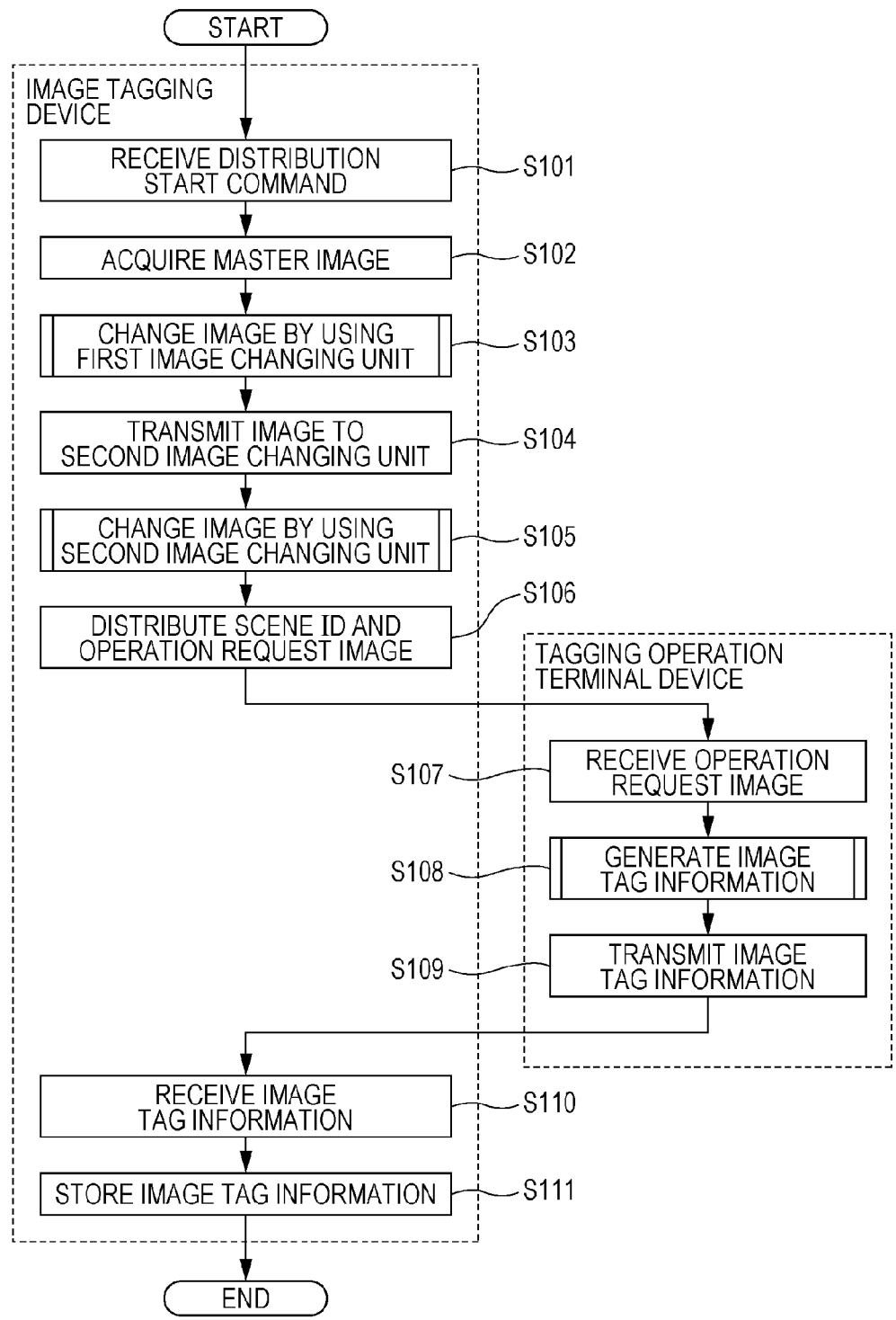

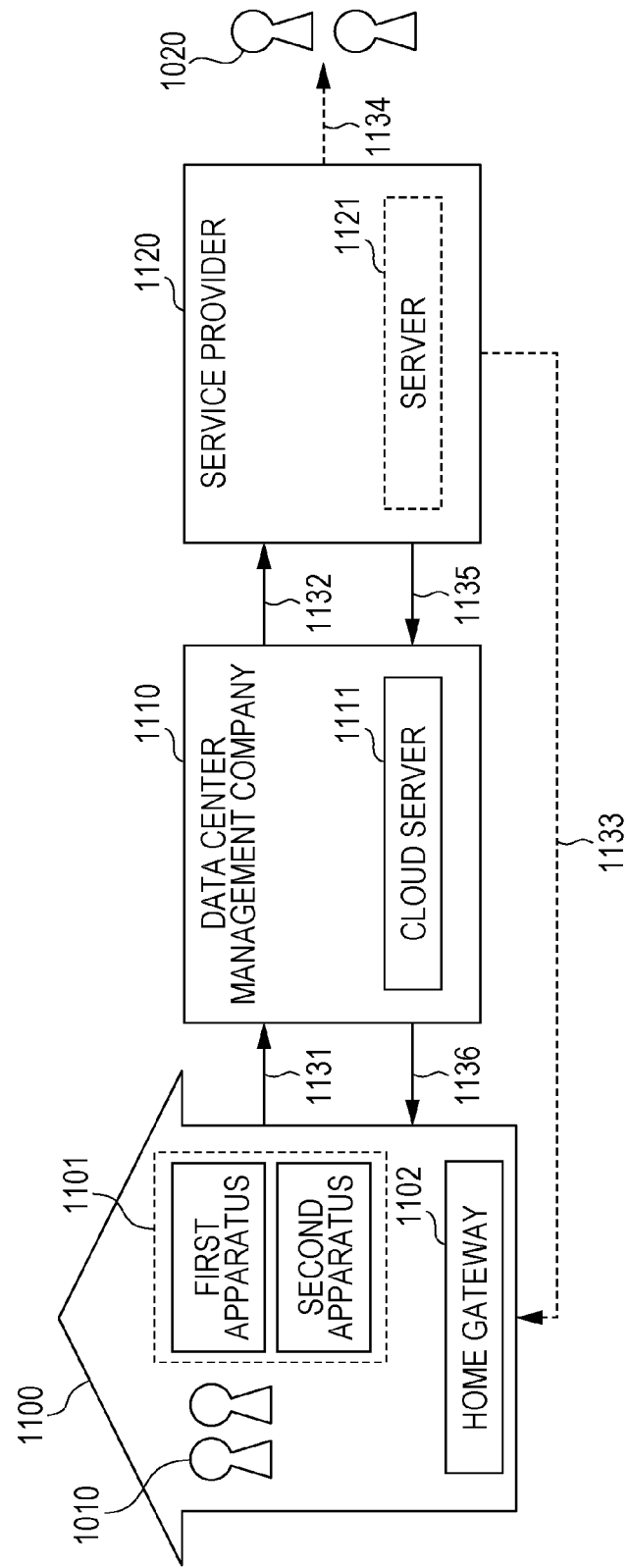

IMAGE TAGGING DEVICE

BACKGROUND

1. Technical Field

The present disclosure relates to an image tagging device utilizing a network represented by the Internet.

2. Description of the Related Art

In recent years, general object recognition based on a learning technique using a neural network called Deep Learning has been exhibiting high performance and attracting attention.

However, in order to achieve high recognition performance in general object recognition based on Deep Learning, it is necessary to perform learning processing of a large number of images, as the learning subjects, with which the name, kind, or the like of an object to be recognized is associated as a tag. Note that it is desirable that the tagged images be images in which the object indicated by the tag is located at the center or occupies a large portion.

In general, it is necessary to prepare approximately ten thousand tagged images, as the learning subjects, to achieve high recognition performance. This requires a lot of manpower and a large number of steps. Furthermore, since the number of steps is enormous, it is assumed that crowdsourcing is used for an operation of finding a portion necessary for recognition from an image such as a photograph or a video frame, cutting the portion out from the image, and tagging the portion. In this case, protection of privacy of persons in the images to be tagged is most important.

Japanese Unexamined Patent Application Publication No. 2007-213181 discloses a technique for generating a privacy-protected image whose image region for each user can be changed depending on the private policy of the user and that properly satisfies requirements for protection of privacy of an individual.

SUMMARY

In one general aspect, the techniques disclosed here feature an image tagging device including: a first functional unit that generates a first image by changing a first region image corresponding to a first object related to privacy information in a master image stored in a first memory and thereby removing the privacy information included in the master image; a second functional unit that acquires the first image generated by the first functional unit and generates an operation request image by changing a second region image corresponding to a second object that is not to be tagged in the first image; an operation request image distributer that distributes the generated operation request image to a tagging operation terminal device connected to the image tagging device over a network; an image tag information receiving unit that receives image tag information, as a response to of the distributed operation request image, from the tagging operation terminal device over the network; and a tagged image generator that generates a tagged image on the basis of the master image and the image tag information.

According to the aspect, a worker can find an image of an object to be recognized in an operation request image, cut out an image region including the image of the object, and tag the image region. It is therefore possible to achieve an improvement in efficiency of a worker's tagging operation in addition to protection of privacy of a human in the operation request image.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a flow chart illustrating processing from distribution of an operation request image to reception of image tag information in the image tagging device;

FIG. 15A is a diagram illustrating the whole picture of crowdsourcing service provided by the image tagging device in the present embodiment;

DETAILED DESCRIPTION

Figure 1:
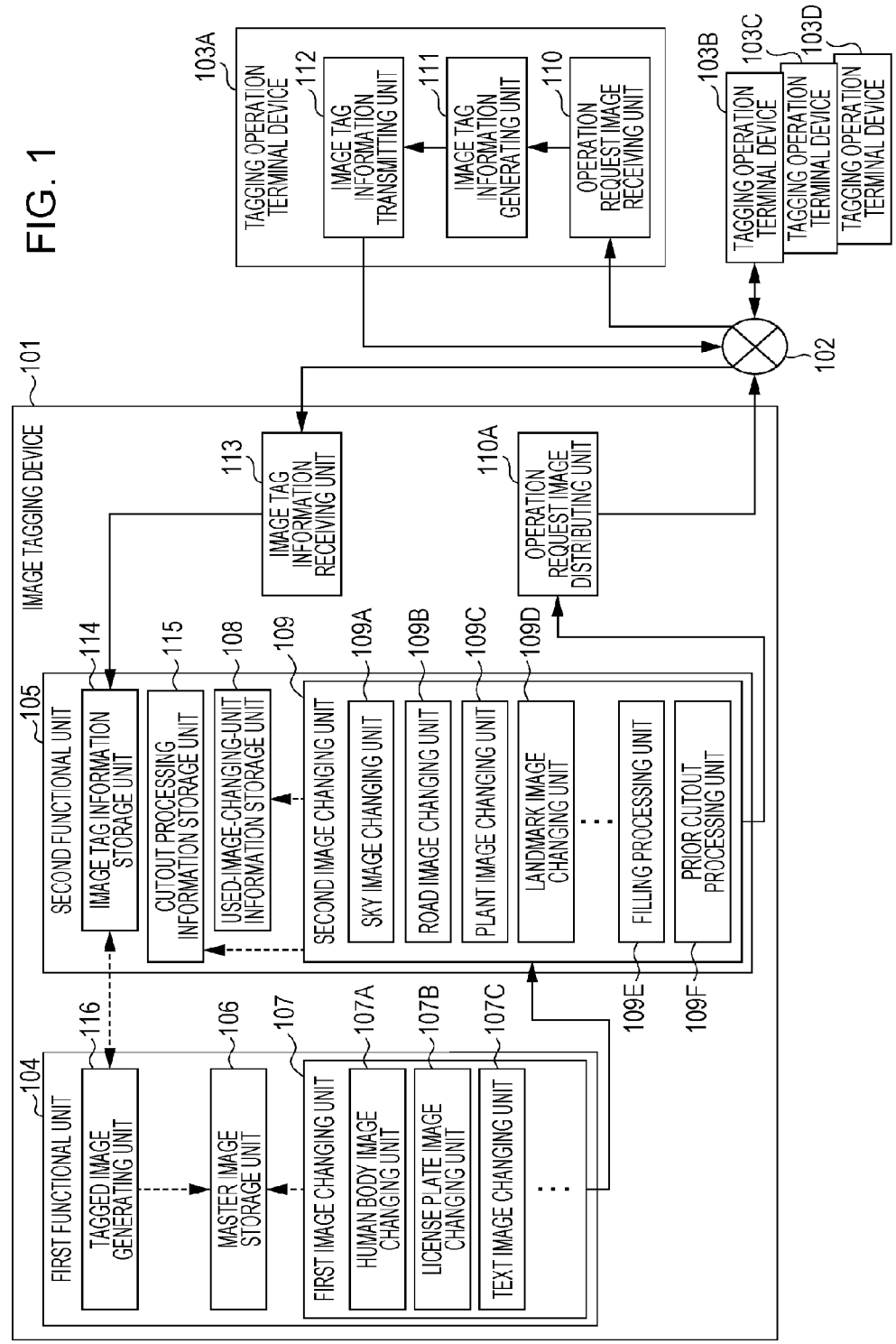
FIG. 1 is a block diagram illustrating an example of a configuration of an image tagging device.

Underlying Knowledge Forming Basis of the Present Disclosure

Techniques concerning general object recognition using Deep Learning have been studied. However, in order to improve recognition performance, it is necessary to prepare a large number of tagged images as the learning subjects, thereby requiring a lot of manpower and a large number of steps. In view of this, use of crowdsourcing service in which a client requests workers to tag a large number of images is assumed.

However, since a service provider or a client distributes a large number of images to workers when implementing (providing) crowdsourcing service, privacy protection of personal information (e.g., a human face or information by which a place or an individual can be specified) in the images is a problem to be solved.

If all objects in the images are subjected to processing for privacy protection (privacy processing), the workers cannot perform a tagging operation. Therefore, only a region of high privacy in each image need be subjected to the privacy processing.

Furthermore, if security strength of methods of storage and access of images that have been subjected to the privacy processing is uniformly set high, increased load is applied to a system that handles a large number of images such as the crowdsourcing service. That is, in setting security strength in the privacy processing (the storage and access methods), it is necessary to take into consideration of processing load (memory load) applied to the system.

The workers perform an operation of tagging a large number of images. For example, if an image includes a large number of objects, the workers cannot instantly judge which of the objects is an object to be tagged, and therefore cannot efficiently perform the tagging operation.

The technique of Japanese Unexamined Patent Application Publication No. 2007-213181 is a technique of performing image changing processing (mosaic, painting out, shading out) for protection of privacy on human portions (face, body, whole body) on the basis of privacy information of each individual. Accordingly, Japanese Unexamined Patent Application Publication No. 2007-213181 does not clearly specify protecting privacy by changing an image of an object other than a human. Furthermore, Japanese Unexamined Patent Application Publication No. 2007-213181 does not consider proper image storage and image access methods according to privacy levels.

That is, in implementing (providing) tagging service using crowdsourcing, it is necessary to reduce processing load on a system side and make a worker's tagging operation efficient while satisfying privacy protection. No technical solution to meet these demands has been conventionally considered.

In order to solve the problems, an image tagging device according to one aspect of the present invention includes:

a first functional unit that generates a first image by changing a first region image corresponding to a first object related to privacy information in a master image stored in a first memory and thereby removing the privacy information included in the master image;

a second functional unit that acquires the first image generated by the first functional unit and generates an operation request image by changing a second region image corresponding to a second object that is not to be tagged in the first image;

an operation request image distributer that distributes the generated operation request image to a tagging operation terminal device connected to the image tagging device over a network;

an image tag information receiving unit that receives image tag information, as a response to the distributed operation request image, from the tagging operation terminal device over the network; and a tagged image generator that generates a tagged image on the basis of the master image and the image tag information.

With the arrangement, a client who requests tagging of an image can distribute, as an operation request image, an image from which privacy information has been removed to a tagging worker, thereby minimizing privacy violation in a case where the operation request image is leaked from a worker's terminal. Furthermore, since an image region of an object that is not to be tagged has been also subjected to image changing processing (e.g., mosaic, shading off, or painting out), the tagging worker need not search for an object to be tagged in this region, and as a result, the efficiency of an operation of cutting out and tagging an image of an object to be tagged improves.

The image tagging device may be arranged such that
the second functional unit includes a second memory;
the second functional unit causes the received image tag information to be stored in the second memory; and
the second functional unit supplies the image tag information stored in the second memory to the tagged image generator.

The image tagging device may be arranged such that
the first functional unit that causes the master image to be stored in the first memory by using a first storage method;
the second functional unit causes the image tag information to be stored in the second memory by using a second storage method; and
the first storage method and the second storage method are different from each other.

Since the data storage method used by the first functional unit is different from that used by the second functional unit, each of the master image and the image from which privacy information has been removed can be managed by methods according to a privacy policy defined by a client. With the arrangement, it is possible to reduce operational costs (e.g., the size of a memory used, the amount of computation, power consumption, price of the equipment, and the like that vary depending on encryption strength) of the image tagging device, as compared with a case where the master image and the image from which privacy information has been removed are managed by the same method.

The image tagging device may be arranged such that
the first storage method has security strength higher than the second storage method.

The image tagging device may be arranged such that the first storage method is a method for encrypting the master image by using a first encryption algorithm and then storing the encrypted master image in the first memory; and the second storage method is a method for encrypting the image tag information by using a second encryption algorithm and then storing the encrypted image tag information in the second memory.

The image tagging device may be arranged such that the first functional unit decrypts the encrypted master image by using first key data;

the second functional unit decrypts the encrypted image tag information by using second key data; and a bit length of the first key data is longer than that of the second key data.

With the arrangement, even if an outsider gains unauthorized access to the second functional unit, it is possible to buy time and take countermeasures until the outsider gains unauthorized access to the first functional unit because the amount of calculation necessary for code breaking, the amount of calculation necessary for authentication analysis, and the like in the first functional unit are larger than those in the second functional unit.

The image tagging device may be arranged such that a first access method by which the first functional unit accesses the master image stored in the first memory is different from a second access method by which the second functional unit accesses the tagged image stored in the second memory.

With the arrangement, the data access method used by the first functional unit is different from that used by the second functional unit, the master image and the image from which privacy information has been removed can be managed by methods according to a privacy policy defined by a client, as compared with a case where the master image and the image from which privacy information has been removed are managed by the same method. With the arrangement, it is possible to reduce operational costs (e.g., the size of memory used, the amount of computation, power consumption, price of the equipment, and the like that vary depending on encryption strength) of the image tagging device.

The image tagging device may be arranged such that the first access method has security strength higher than the second access method.

The image tagging device may be arranged such that the first access method used by the first functional unit requires a larger memory region than the second access method used by the second functional unit. Also, the image tagging device may be arranged such that the first access method used by the first functional unit requires a larger amount of computation for access than the second access method used by the second functional unit.

With the arrangement, the first functional unit has high security strength, and it is possible to reduce operational costs, as compared with a configuration in which the size of a memory used for computation of encryption and the number of steps are uniformly made large in all of the functional units of the image tagging device.

The image tagging device may be arranged such that the first functional unit includes a first image changing unit;

the second functional unit includes a second image changing unit;

the first image changing unit detects the first object in the master image and then changes the first region image corresponding to the detected first object; and the second image changing unit detects the second object in the first image and then changes the second region image corresponding to the detected second object.

The image tagging device may be arranged such that the first object includes different kinds of objects;

the first image changing unit includes a plurality of image changers; and the plurality of image changers detects the different kinds of objects in the master image and then change images of regions corresponding to the detected different kinds of objects.

Since the first functional unit changes an image by driving image changers for various general objects sequentially or in parallel instead of changing an image by using a single image changer, the area of an image region changed for privacy protection can be increased in an operation request image.

The image tagging device may be arranged such that the second object includes different kinds of objects;

the second image changing unit includes a plurality of image changers; and the plurality of image changers detects the different kinds of objects in the first image and then change images of regions corresponding to the detected different kinds of objects.

With the arrangement, since the second functional unit changes an image by driving image changers for various general objects sequentially or in parallel instead of changing an image by using a single image changer, the area of an image region changed for an improvement of efficiency of a tagging operation can be increased in an operation request image.

The image tagging device may be arranged such that the first image changing unit includes a first image changer that detects, as the first object, an object that is preset as an object that requires privacy protection in the master image and then changes the first region image corresponding to the detected first object in the master image.

With the arrangement, image changers that detect, as first objects, objects concerning privacy such as a human, a license plate, and a text on a signboard and change images of the objects are driven. This makes it possible to increase the area of image regions changed for privacy protection in the operation request image.

The image tagging device may be arranged such that the second image changing unit includes a second image changer that detects, as the second object, an object that is preset as an object that is not to be tagged in the first image and then changes the second region image corresponding to the detected second object in the first image.

With the arrangement, image changers that detect objects unnecessary for an image tagging operation and change images of the objects are driven. This makes it possible to increase the area of image regions changed for an improvement in efficiency of a tagging operation in the operation request image.

The image tagging device may be arranged such that the second image changing unit includes a filling processor that changes an image of a region of a portion that satisfies a predetermined condition among region images that are different from the first region image and the second region image in the first image in which the second region image has been changed by the second image changer.

With the arrangement, it is possible to increase the area of image regions changed for an improvement in efficiency of a tagging operation in the operation request image.

The image tagging device may be arranged such that the second image changing unit includes a prior cutout processor that computes an area of a region image that is different from the first region image and the second region image in the first image in which the second region image has been changed by the second image changer, and then sets, as the operation request image, a rectangular image including the region image in a case where the area of the region image is equal to or larger than a threshold value.

With the arrangement, it is possible to distribute an image in which an image region to be tagged occupies a large portion thereof, thereby making it possible to improve the efficiency of the tagging operation.

The image tagging device may be arranged such that the first image changing unit includes at least one of (i) a human image changer that detects, as the first object, a human in the master image and then changes the first region image corresponding to the detected first object, (ii) a license plate image changer that detects, as the first object, a license number of a vehicle in the master image and then changes the first region image corresponding to the detected first object, and (iii) a text image changer that detects, as the first object, a text in the master image and then changes the first region image corresponding to the detected first object.

The image tagging device may be arranged such that the second image changing unit includes at least one of (i) a sky image changer that detects, as the second object, sky in the first image and then changes the second region image corresponding to the detected second object in the first image, (ii) a road image changer that detects, as the second object, a road in the first image and then changes the second region image corresponding to the detected second object in the first image, (iii) a plant image changer that detects, as the second object, a plant in the first image and then changes the second region image corresponding to the detected second object in the first image, and (iv) a landmark image changer that detects, as the second object, a landmark including a building in the first image and then changes the second region image corresponding to the detected second object in the first image.

The embodiment described below is a specific example of the present disclosure. Numerical values, shapes, materials, constituent elements, steps, the order of steps, and the like described in the embodiment below are examples of the present disclosure and do not limit the present disclosure. Among the constituent elements in the embodiment below, constituent elements that are not described in the independent claims that show highest concepts of the present disclosure are described as optional constituent elements. The contents in all of the embodiments can be combined.

Whole Picture of Provided Service

First, the whole picture of crowdsourcing service provided by an image tagging device in the present embodiment is described.

FIG. 15A is a diagram illustrating the whole picture of crowdsourcing service provided by an image tagging device in the present embodiment. For example, the crowdsourcing service is provided by using an information management system illustrated in FIG. 15A.

A group 1100 is, for example, a company, an organization, a household, or the like, and the scale of the group 1100 is not limited. The group 1100 includes a plurality of devices 1101 including a first device and a second device, and a home gateway 1102. The plurality of devices 1101 include devices (e.g., a smartphone, a personal computer (PC), a television set, or the like) connectable to the Internet. The plurality of devices 1101 may include devices that are not connectable to the Internet by themselves but can be connected to the Internet via the home gateway 1102. A tagging worker 1010 uses the plurality of devices 1101 included in the group 1100. The plurality of devices 1101 are, for example, a tagging operation terminal device 103A, a tagging operation terminal device 103B, a tagging operation terminal device 103C, and a tagging operation terminal device 103D illustrated in FIG. 1 that will be described later.

A data center management company 1110 includes a cloud server 1111. The cloud server 1111 is a virtual server that works in cooperation with various devices over the Internet. The cloud server 1111 mainly manages enormous data (big data) or the like that is difficult to handle with the use of a general database management tool or the like. The data center management company 1110, for example, manages data and the cloud server 1111 and runs a data center for management of the data and the cloud server 1111. Details of service provided by the data center management company 1110 will be described later.

Figure 15B:
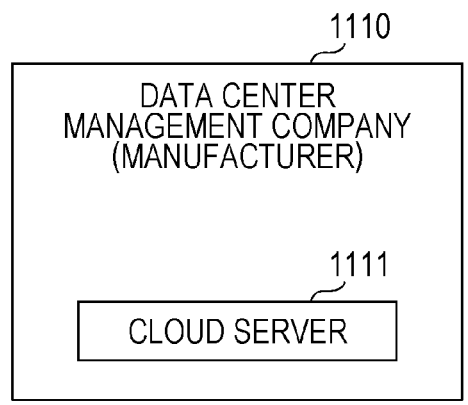
FIG. 15B is a diagram illustrating an example in which a manufacturer corresponds to a data center management company in the present embodiment.
Figure 15C:
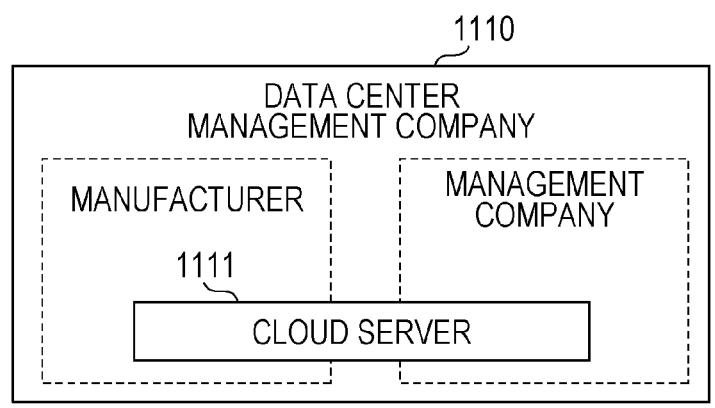
FIG. 15C is a diagram illustrating an example in which both of or either one of a manufacturer and a management company correspond(s) to a data center management company in the present embodiment.

The data center management company 1110 is not limited to a company for management of data or management of the cloud server 1111 only. For example, as illustrated in FIG. 15B, in a case where a manufacturer that develops or manufactures one of the plurality of devices 1101 is in charge of management of data, management of the cloud server 1111, or the like, the manufacturer corresponds to the data center management company 1110. The data center management company 1110 is not limited to a single company. For example, as illustrated in FIG. 15C, in a case where a manufacturer and a management company are jointly or separately in charge of management of data or management of the cloud server 1111, both of or either one of the manufacturer and the management company correspond(s) to the data center management company 1110.

The service provider 1120 includes a server 1121. The scale of the server 1121 is not limited, and examples thereof include a memory of a personal computer. The service provider 1120 may include no server 1121.

Some of or all of constituent elements included in an image tagging device 101 that will be described later may be provided in the cloud server 1111 or may be provided in the server 1121.

Note that the home gateway 1102 is not essential in the information management system described above. For example, in a case where the cloud server 1111 is in charge of management of all data, the home gateway 1102 is unnecessary. Furthermore, in a case where there is no device that is not connectable to the Internet by itself like a case where all devices in a household are connected to the Internet, the home gateway 1102 is unnecessary.

Next, a flow of information in the information management system is described.

First, the first device or the second device of the group 1100 transmits image tag information to the cloud server 1111 of the data center management company 1110. The cloud server 1111 accumulates therein the image tag information of the first device or the second device (arrow 1131 in FIG. 15A). Note that the image tag information may be provided to the cloud server 1111 directly from the plurality of devices 1101 themselves over the Internet. Alternatively, the image tag information from the plurality of devices 1101 may be accumulated once in the home gateway 1102 and then supplied from the home gateway 1102 to the cloud server 1111.

Next, the cloud server 1111 of the data center management company 1110 provides the accumulated image tag information to the service provider 1120 in a constant unit amount. The constant unit amount may be one that allows the information accumulated in the data center management company 1110 to be provided to the service provider 1120 in an organized manner or may be one requested by the service provider 1120. However, the amount of provided information may vary depending on the situation instead of providing the information in a constant unit amount. The image tag information is stored in the server 1121 of the service provider 1120 as needed (arrow 1132 in FIG. 15A). Then, the service provider 1120 provides the image tag information to a client 1020 (arrow 1134 in FIG. 15A).

Operation request image information to be supplied to the tagging worker (e.g., an ID that uniquely indicates image data to be tagged or a distributed image, request information that indicates what object is included in images that need be tagged, or the like) may be distributed, for example, directly from the service provider 1120 to the tagging worker 1010 (arrow 1133 in FIG. 15A). Alternatively, the operation request image information may be, for example, provided to the tagging worker 1010 from the service provider 1120 via the cloud server 1111 of the data center management company 1110 (arrows 1135 and 1136 in FIG. 15A).

Embodiment

In the present embodiment, the image tagging device 101 for generating a tagged image of a road sign (e.g., a warning sign, a regulatory sign, or an indication sign) is described as an example with reference to FIG. 1. FIG. 11 illustrates a processing flow of the image tagging device 101 in the present embodiment.

The image tagging device 101 and the tagging operation terminal devices 103A through 103D are connected over the network 102 and transmit and receive data over the network 102.

The image tagging device 101 includes a first functional unit 104, a second functional unit 105, an operation request image distributing unit 110A, and an image tag information receiving unit 113.

As for a hardware configuration, the image tagging device 101 includes, for example, a processor, a memory, and the like (not illustrated). A program is, for example, stored in the memory. The program is, for example, a program that causes at least one of the first functional unit 104, the second functional unit 105, the operation request image distributing unit 110A, and the image tag information receiving unit 113 to function. The processor executes the program, and thus at least one of the first functional unit 104, the second functional unit 105, the operation request image distributing unit 110A, and the image tag information receiving unit 113 functions.

In a case where programs corresponding to the first functional unit 104, the second functional unit 105, the operation request image distributing unit 110A, and the image tag information receiving unit 113, respectively are stored in the memory, the first functional unit 104, the second functional unit 105, the operation request image distributing unit 110A, and the image tag information receiving unit 113 function upon processor's execution of these programs.

The image tagging device 101 may include an integrated circuit into which a function of at least one of the first functional unit 104, the second functional unit 105, the operation request image distributing unit 110A, and the image tag information receiving unit 113 is incorporated. With the arrangement, a program corresponding to the function incorporated into the integrated circuit is unnecessary.

The first functional unit 104 includes a tagged image generating unit 116, a master image storage unit 106, and a first image changing unit 107 as illustrated in FIG. 1.

The first functional unit 104 is constructed by using a policy having higher security strength than another functional unit. The other functional unit is, for example, the second functional unit 105.

The first functional unit 104 includes, for example, a first memory (not illustrated). From the perspective of security, it is desirable that only the first functional unit 104 can access the first memory, but another unit may be able to access the first memory.

The second functional unit 105 includes, for example, a memory (second memory) (not illustrated). From the perspective of security, it is desirable that only the second functional unit 105 can access the second memory, but another unit may be able to access the second memory.

The first functional unit 104 stores data in the first memory by using a predetermined storage method (first storage method).

The second functional unit 105 stores data in the second memory by using a predetermined storage method (second storage method).

The first storage method and the second storage method are different storage methods, and the first storage method is a storage method whose security strength is higher than the second storage method.

The storage methods are, for example, data encryption methods.

For example, the second functional unit encrypts data by using an Advanced Encryption Standard (AES) method using a block length of 128 bits (second encryption method) as a data encryption method and then stores the encrypted data in the second memory.

Meanwhile, the first functional unit 104 encrypts data by using an AES method using a block length of 256 bits (first encryption method) and then stores the encrypted data in the first memory.

The first encryption method is an AES method whose bit length of a block is longer than that of the second encryption method, and therefore has higher security strength than the second encryption method.

The first functional unit 104 accesses the encrypted data stored in the first memory by using a predetermined access method (first access method).

The second functional unit 105 accesses the encrypted data stored in the second memory by using a predetermined access method (second access method).

The first access method and the second access method are different access methods, and the first access method is a access method whose security strength is higher than that of the second access method.

The access methods for accessing encrypted data are methods for obtaining decrypted data after decrypting the encrypted data by using key data.

For example, the first functional unit 104 decrypts the encrypted data by using predetermined key data when accessing the encrypted data stored in the first memory.

In a case where the first functional unit 104 accesses the encrypted data, the first functional unit 104 temporarily secures a region for decryption in the first memory, decrypts the encrypted data in this region, and performs processing using the decrypted data.

In a case where a plurality of encrypted data are stored in the first memory, the first functional unit 104 may decrypt the plurality of encrypted data by using the same key data or may decrypt the plurality of encrypted data by using respective different key data.

In the present embodiment, key data used for decryption by the first functional unit 104 is first key data.

Furthermore, for example, in a case where the second functional unit 105 accesses the encrypted data stored in the second memory, the second functional unit 105 decrypts the encrypted data by using predetermined key data.

In a case where the second functional unit 105 accesses the encrypted data, the second functional unit 105 temporarily secures a region for decryption in the second memory, decrypts the encrypted data in this region, and performs processing using the decrypted data.

In a case where a plurality of encrypted data are stored in the second memory, the second functional unit 105 may decrypt the plurality of encrypted data by using the same key data or may decrypt the plurality of encrypted data by using respective different key data.

In the present embodiment, key data used for decryption by the second functional unit 105 is second key data.

The bit length of the key data used for decryption by the first functional unit 104 is longer than that of the key data used for decryption by the second functional unit 105.

As a result, in a case where the size of the data encrypted by the first encryption method used by the first functional unit 104 is the same as that of the data encrypted by the second encryption method used by the second functional unit 105, the size of the memory region that should be secured for decryption of the data encrypted by the first encryption method used by the first functional unit 104 is larger than that of the memory region that should be secured for decryption of the data encrypted by the second encryption method used by the second functional unit 105.

Furthermore, even in a case where the size of the data encrypted by the first encryption method used by the first functional unit 104 is different from that of the data encrypted by the second encryption method used by the second functional unit 105, the size of the memory region that should be secured for decryption by the first functional unit 104 that uses the first encryption method whose security strength is higher than that of the second encryption method is, in many cases, larger than that of the memory region that should be secured for decryption by the second functional unit 105.

Furthermore, the amount of computation necessary for decryption of the data encrypted by the first encryption method used by the first functional unit 104 is larger than that of computation necessary for decryption of the data encrypted by the second encryption method used by the second functional unit 105.

Note that the second functional unit 105, the operation request image distributing unit 110A, and the image tag information receiving unit 113 may have the same security strength.

In the image tagging device 101 configured as above, the first functional unit 104 first receives a distribution start command as illustrated in FIG. 11 (Step S101). The distribution start command includes at least an ID (scene ID) that uniquely indicates a distributed image. The scene ID is made up of a numeral, a character, a symbol, or the like.

Next, upon receipt of the distribution start command, the first image changing unit 107 acquires an image (master image) corresponding to the scene ID from the master image storage unit 106 (Step S102).

Figure 2:
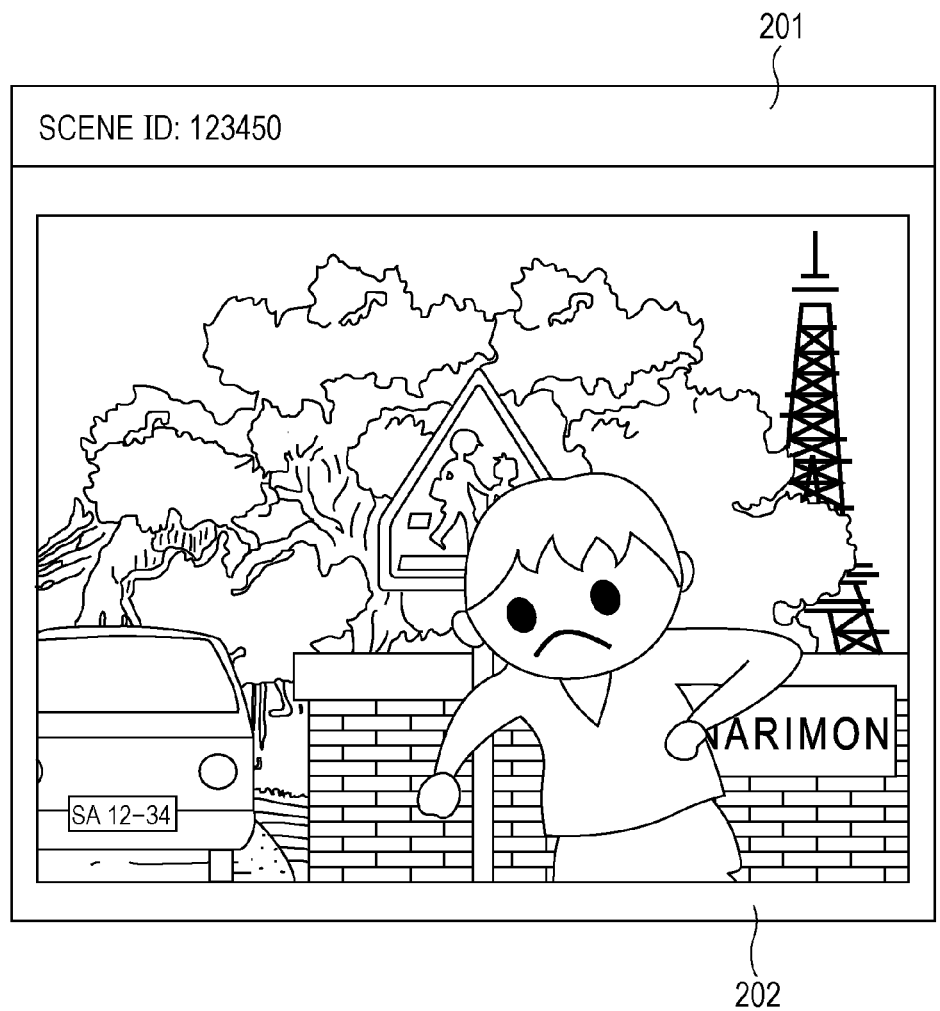
FIG. 2 is a diagram illustrating an example of a configuration of a master image stored in a master image storage unit.

FIG. 2 is a diagram illustrating an example of a configuration of a master image stored in the master image storage unit 106. The master image 202 is an image taken at any time at any place, and there is a possibility that the master image 202 includes privacy information. In the master image storage unit 106, the master image 202 is stored in association with a scene ID 201. Needless to say, a plurality of such images may be stored. The master image storage unit 106 is part of the first memory (not illustrated). In the master image storage unit 106, data used by the first functional unit 104 is stored. The first memory is, for example, a writable memory, a hard disc, or the like.

The first functional unit 104, for example, stores the master image in the master image storage unit 106 by using the first storage method. The first storage method is a method of encrypting the master image by using the AES method using a block length of 256 bits (the first encryption method) and then storing the encrypted master image in the master image storage unit 106.

Furthermore, the first functional unit 104 accesses the encrypted master image stored in the master image storage unit 106 by using the first access method. The first access method is a method of obtaining the decrypted master image by decrypting the encrypted master image by using the first key data. The first key data used to decrypt the encrypted master image is, for example, stored in advance in the first memory which the first functional unit 104 manages.

Next, the first image changing unit 107 performs image changing processing for removing privacy information of the master image (Step S103).

Figure 12:
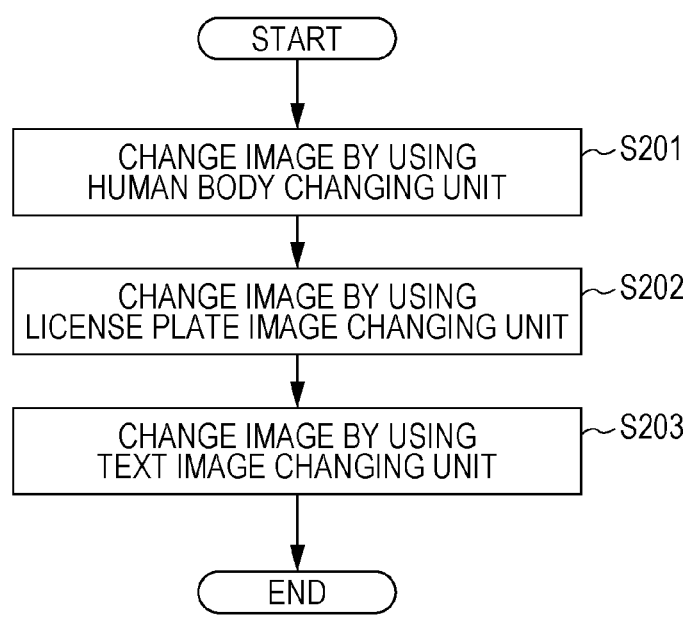
FIG. 12 is a flow chart illustrating processing for changing an image in a first image changing unit.

FIG. 12 is a flow chart of the image changing processing in which the first image changing unit 107 removes the privacy information in the master image in the present embodiment. Removing the privacy information in the master image means, for example, that the object in the master image is made impossible to specify by changing an image of a region of the object related to privacy in the master image.

Furthermore, it is assumed that the first image changing unit 107 has acquired the decrypted master image by accessing the encrypted master image in the master image storage unit 106 by using the first access method.

In the following description, the decrypted master image is referred to as a master image. An example of the image changing processing by the first image changing unit 107 is described below by using the master image illustrated in FIG. 3.

The first image changing unit 107 detects an object (first object) related to privacy information in the master image. Furthermore, the first image changing unit 107 changes an image of a first region (first region image) corresponding to the detected first object in the master image.

The number of objects related to the privacy information may be 1 or may be more than 1. The number of kinds of objects related to the privacy information may be 1 or may be more than 1.

In the present embodiment, an example in which the plural kinds of objects related to the privacy information are a human, a license plate of a car, and an object including text information is described.

In the present embodiment, in a case where there are plural objects related to privacy information, the first image changing unit 107 includes changers corresponding to the respective objects. The changers detect the respective corresponding objects in the master image and then change images of regions (first region images) corresponding to the detected objects (first objects) in the master image.

In the present embodiment, since the objects related to privacy information are three objects, i.e., a human, a license plate of a car, and an object including text information, the first image changing unit 107 includes three changing units, i.e., a human body image changer 107A, a license plate image changer 107B, and a text image changer 107C.

The first image changing unit 107 may include a plurality of changers that detect objects of specific kinds related to privacy and then change images of regions corresponding to the respective detected objects. The plurality of changers detect different kinds of objects.

In this case, for example, the first image changing unit 107 may preset, in the first memory, information concerning the kind of an object related to privacy information and select and operate a changer corresponding to the set object from among the plurality of changers.

In this case, for example, a person who operates the image tagging device 101 may set, in the first memory, information concerning an object related to the privacy information in the master image when generating a first image from the master image.

With the arrangement, the first image changing unit 107 can read out the information concerning the object related to the privacy information in the master image from the first memory and change an image of a region corresponding to the object related to the privacy information in the master image.

This makes it possible to operate only a necessary changer of the first image changing unit 107 for each master image, and therefore it can be expected that a period of the processing in the first image changing unit 107 becomes short.

A method for detecting an object related to privacy information in a master image can be, for example, an existing method such as a method using a pattern matching or a method using a learning algorithm, and therefore detailed description thereof is omitted.

First, the human body image changer 107A determines that an object 301 is a human by performing object detection on the master image, and then changes an image of a region corresponding to the object 301 (Step S201). Next, the license plate image changer 107B determines that an object 302 is a license plate by performing object detection on the master image, and then changes an image of a region corresponding to the object 302 (Step S202). Then, the text image changer 107C determines that an object 303 is a text image by performing object detection on the master image, and then changes an image of a region corresponding to the object 303 (Step S203).

The processing for changing an image of a corresponding region in each of Steps S201 through S203 is, for example, processing for painting the image of the corresponding region in a predetermined color (e.g., black).

Figure 4:
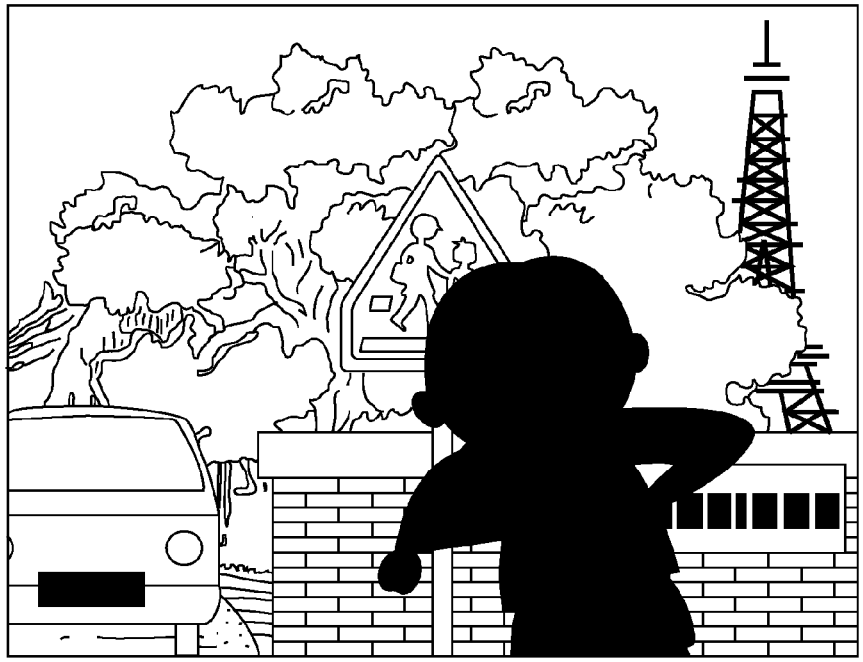
FIG. 4 is a diagram illustrating an example of an image obtained after the master image is changed by a first image changing unit.

FIG. 4 is a diagram illustrating an example of a result (primary changed image) obtained by changing the images of the regions corresponding to the object 301, the object 302, and the object 303 detected in the master image.

Figure 3:
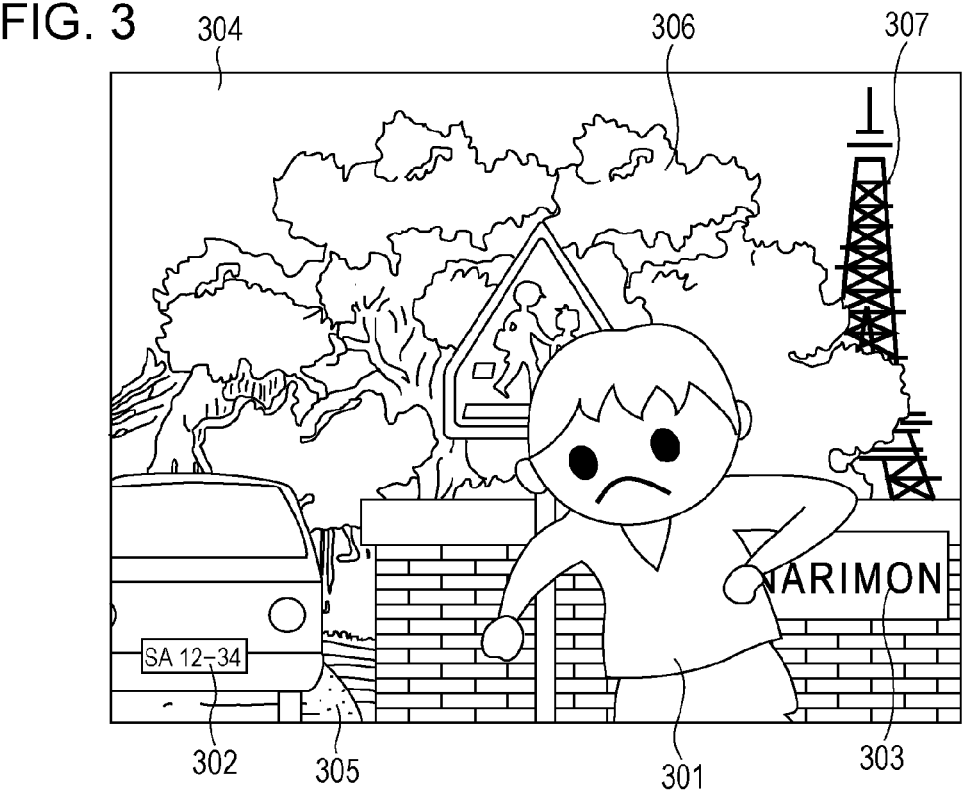
FIG. 3 is a diagram illustrating an example of the master image.

As is clear from FIG. 4, the image of the region that corresponds to the object 301 corresponding to the human, the image of the region that corresponds to the object 302 corresponding to the license plate of the car, and the image of the region that corresponds to a text portion of the object 303 including a text in the master image illustrated in FIG. 3 are blackened out in the primary changed image.

Since the image of the region that corresponds to the object 301 corresponding to the human is blackened out, it is possible to recognize that the human is in the image, but it is impossible to specify who the human is. Furthermore, since the image of the region that corresponds to the object 302 corresponding to the car license plate is blackened out, it is impossible to specify a person who possesses the car on the basis of the license plate. Furthermore, since the text portion of the object 303 including a text is blackened out, it is impossible to specify a place where the master image was taken on the basis of the text information.

A primary changed image (first image) from which the privacy information included in the master image has been removed is generated by the image changing processing in the first image changing unit 107. In a case where an object that can be privacy information newly occurs as a result of a change of a legal system and recognition of general public, an image changer corresponding to the object is added.

In FIG. 12, the image changing processing in the human body image changer 107A, the image changing processing in the license plate image changer 107B, and the image changing processing in the text image changer 107C are sequentially illustrated, but may be performed in parallel. The number of kinds of the image changing processing is not limited to one. For example, the image changing processing in the human body image changer 107A may be mosaic processing, and the image changing processing in the other changer may be painting out processing.

Next, the primary changed image generated by the first functional unit 104 (more specifically, the first image changing unit 107) is transmitted to the second functional unit 105 (more specifically, the second image changing unit 109) (Step S104). The second functional unit 105 acquires the generated primary changed image from the first functional unit 104. The second functional unit 105 (more specifically, the second image changing unit 109) performs image changing processing on the primary changed image (Step S105).

The primary changed image includes a plant, a building (steel tower), and the like in addition to a road sign (e.g., a warning sign, a regulatory sign, or an indication sign) that is an object which is a target of generation of a tagged image.

Although the plant, the building (steel tower), which is an example of a landmark, and the like may have low relevance with privacy information, there is a possibility that it takes a time for a person who performs a tagging operation to specify a portion of the image should be tagged.

In view of this, for example, the second image changing unit 109 further detects an object (second object) that is not to be tagged in the primary changed image (the first image obtained by removing the privacy information from the master image) illustrated in FIG. 4, and then changes an image of a second region (second region image) corresponding to the second object detected in the primary changed image.

The number of objects that are not to be tagged may be 1 or may be more than 1. The number of kinds of objects that are not to be tagged may be 1 or may be more than 1.

In a case where there are a plurality of objects that are not to be tagged, the second image changing unit 109 includes changers corresponding to the respective objects. The changers detect the corresponding objects in the primary changed image, and then changes images of regions (second region images) corresponding to the detected objects in the primary changed image.

In the present embodiment, an example in which the objects that are not to be tagged are sky, a road, a plant, and a landmark is described.

In the present embodiment, since the objects that are not to be tagged are four objects, i.e., sky, a road, a plant, and a landmark, the second image changing unit 109 includes a sky image changer 109A, a road image changer 109B, a plant image changer 109C, and a landmark image changer 109D.

Furthermore, the second image changing unit 109 may include a plurality of changers that detect objects of predetermined specific kinds and change images of regions corresponding to the detected objects. The plurality of changers detect different kinds of objects.

In this case, for example, the second image changing unit 109 may preset, in the second memory, information concerning an object that is not to be tagged and select and operate a changer corresponding to the set object from among the plurality of changers.

In this case, for example, a person who operates the image tagging device 101 need just set, in the second memory, information concerning an object that is not to be tagged in the master image when generating an operation request image from the master image.

With the arrangement, the second image changing unit 109 can read out the information concerning an object that is not to be tagged from the second memory and change an image of a region corresponding to the object that is not to be tagged in the primary changed image (or the master image).

This makes it possible to operate only a necessary changer of the second image changing unit 109 for each master image, and it can therefore be expected that a period of the processing in the second image changing unit 109 becomes short.

A method for detecting an object that is not to be tagged in the first image can be, for example, an existing method such as a method using pattern matching or a method using a learning algorithm, and therefore description thereof is omitted.

The second image changing unit 109 further includes a filling processor 109E and a prior cutout processor 109F.

Figure 13:
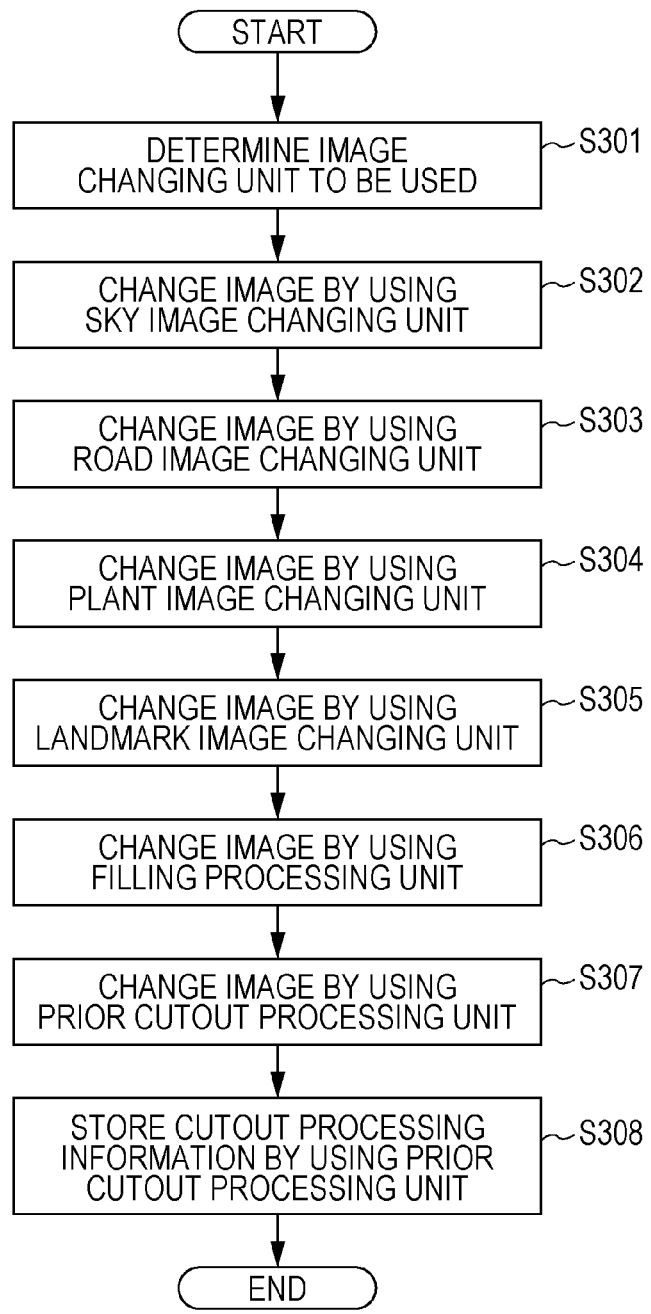
FIG. 13 is a flow chart illustrating processing for changing an image in a second image changing unit.

FIG. 13 is a flow chart of image changing processing performed on a primary changed image in the second image changing unit 109 in the present embodiment.

First, an image changer to be used to change the primary changed image is determined by acquiring setting information that defines the image changing unit to be used from a used-image-changing-unit information storage unit 108 (Step S301). In the present embodiment, setting information that describes the sky image changer 109A, the road image changer 109B, the plant image changer 109C, the landmark image changer 109D, the filling processor 109E, and the prior cutout processor 109F is acquired from the used-image-changing-unit information storage unit 108. The setting information stored in the used-image-changing-unit information storage unit 108 may be, for example, information described in advance by a client or may be, for example, information that is automatically overwritten and stored on the basis of data included in the distribution start command.

The used-image-changing-unit information storage unit 108 is, for example, part of the second memory (not illustrated) managed by the second functional unit 105. The second memory is, for example, a writable memory, a hard disc, or the like.

The second functional unit 105, for example, stores the setting information in the used-image-changing-unit information storage unit 108 by using the second storage method. The second storage method is a method for encrypting setting information by using the AES method using a block length of 128 bits (the second encryption method) and storing the encrypted setting information in the used-image-changing-unit information storage unit 108.

Furthermore, the second functional unit 105 accesses the setting information corresponding to the encrypted data stored in the used-image-changing-unit information storage unit 108 by using the second access method. The second access method is a method for obtaining the setting information by decrypting the encrypted setting information by using the second key data.

The second key data used to decrypt the encrypted setting information is, for example, stored in advance in the second memory managed by the second functional unit 105.

Figure 5:
FIG. 5 is a diagram illustrating an example of an image obtained after a primary changed image is changed by a second image changing unit.

Next, image processing is performed on the primary changed image on the basis of the setting information. First, the sky image changer 109A determines that an object 304 is sky by performing object detection on the primary changed image and then changes an image of a region of the object 304 (Step S302). Next, the road image changer 109B determines that an object 305 is a road by performing object detection on the primary changed image and then changes an image of a region of the object 305 (Step S303). Next, the plant image changer 109C determines that an object 306 is a plant by performing object detection on the primary changed image and then changes an image of a region of the object 306 (Step S304). Then, the landmark image changer 109D determines that an object 306 is a landmark (e.g., a symbolic building such as a tower or a castle or a symbolic natural object) by performing object detection on the primary changed image and then changes an image of a region of the object 306 (Step S305). FIG. 5 illustrates an example of a result of the image changing processing performed on the primary changed image in a case where all of the image changing processing in S302, the image changing processing in S303, the image changing processing in S304, and the image changing processing in S305 in FIG. 13 are painting out processing.

As is clear from FIG. 5, the object 304 corresponding to the sky, the object 305 corresponding to the road, the object 306 corresponding to the plant, and the object 307 corresponding to the landmark in the primary changed image illustrated in FIG. 4 are further blackened out.

Next, the filling processor 109E performs filling processing. The filling processing is performed on the image (the image in FIG. 5) obtained after the primary changed image is subjected to the processing in the sky image changer 109A, the road image changer 109B, the plant image changer 109C, and the landmark image changer 109D.

For example, in the image illustrated in FIG. 5, an image of a region corresponding to a road sign, an image of a region corresponding to a car, and an image of a region corresponding to a wall are images of regions that have not been changed by the first image changing unit 107 and the second image changing unit. Note, however, that the images of the text portions in the image of the region corresponding to the wall have been changed by the first image changing unit 107.

The image of the wall remains unchanged between the blackened portions of the text information. Furthermore, an image corresponding to a contour portion of the plant remains unchanged. Images of regions corresponding to these portions, for example, have a small number of pixels in a horizontal direction or a vertical direction, and therefore even if these images are changed, the influence of the change is small.

The filling processing is, for example, processing for detecting an image of a region that can be changed without influence as described above from among images of regions that remain unchanged and then changing the detected image.

Specifically, in the filling processing, for example, region images (i.e., image regions that remain unchanged) that are different from the first region images and the second region images in the image illustrated in FIG. 5 are scanned, and a region among the scanned regions that satisfies a predetermined condition is changed (Step S306).

In the filling processing, for example, in a case where the number of consecutive pixels in the horizontal direction obtained by scanning the region images in the horizontal direction while fixing the position in the vertical direction is equal to or smaller than a predetermined threshold value (first threshold value), pixel values of these pixels are changed.

In the filling processing, for example, in a case where the number of consecutive pixels in the vertical direction obtained by scanning the region images in the vertical direction while fixing the position in the horizontal direction is equal to or smaller than a predetermined threshold value (second threshold value), pixel values of these pixels are changed.

In the filling processing, for example, an image of a region having an area equal to or smaller than a predetermined threshold value (third threshold value) among the scanned region images is changed.

This makes it possible to, for example, change an image of a region that can be changed without large influence among the region images that are different from the first region images and the second region images in the image illustrated in FIG. 5.

Figure 6:
FIG. 6 is a diagram illustrating an example of an image obtained after an image is changed by a filling processing unit.

FIG. 6 illustrates an example of a result of the image changing processing in Step S306 performed on the image illustrated in FIG. 5.

As is clear from FIG. 6, in the image that has been subjected to the filling processing, the images of the regions corresponding to the portions between the blackened portions of the text information in the wall image and the contour portion of the plant in the image illustrated in FIG. 5 are further blackened out.

Figures 7A, 7B:
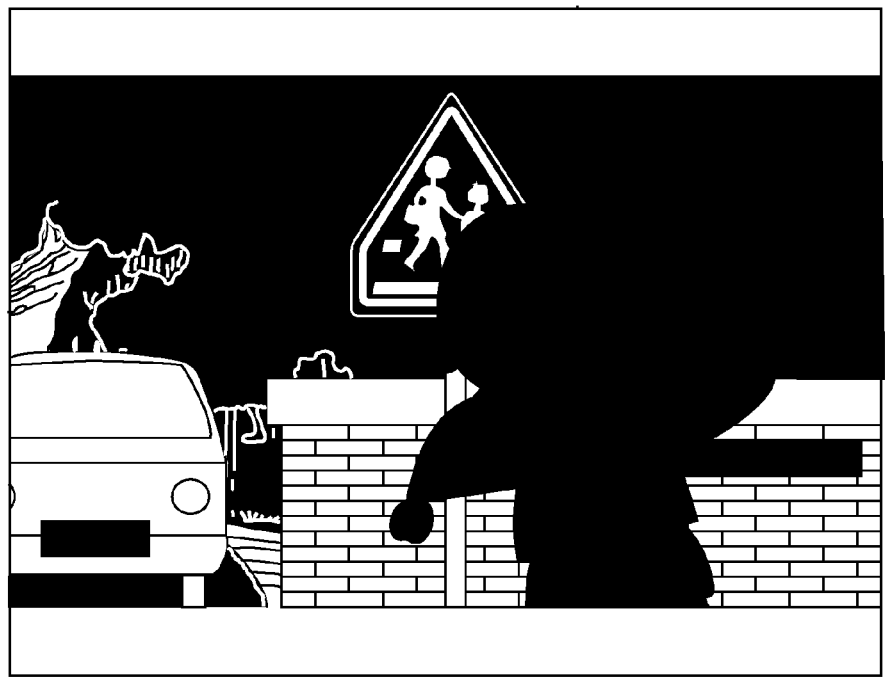
FIG. 7A is a diagram illustrating an example of an image obtained after an image is changed by a prior cutout processing unit.
FIG. 7B is a diagram illustrating an example of a configuration of cutout processing information.

Then, the prior cutout processor 109F performs prior cutout processing. In the prior cutout processing, for example, an image unchanged region that corresponds to an image of a region that is different from the first region images, the second region images, and the image of the region that has been subjected to the filling processing in FIG. 6 is scanned, and in a case where the area of the image unchanged region is equal to or larger than a predetermined threshold value (fourth threshold value: area threshold value information for prior cutout processing), a rectangular image encompassing the image unchanged region is generated from the image in FIG. 6 (Step S307). FIG. 7A illustrates an example of a result of the image changing processing in Step S307 performed on the image illustrated in FIG. 6. The image illustrated in FIG. 7A is generated by extracting a rectangular image encompassing the road sign, the car, and the wall from the image illustrated in FIG. 6. For example, the image illustrated in FIG. 7A is generated by cutting off an image in the vicinity of the upper end of the image illustrated in FIG. 6. In the present embodiment, this image is an operation request image. With the arrangement, it is possible to reduce the size of the operation request image.

Note that the prior cutout processor 109F generates cutout processing information and stores the generated cutout information in the cutout processing information storage unit 115 (Step S308). The cutout processing information is information which associates information indicating a content of executed process with a scene ID. The cutout processing information storage unit 115 is a memory region, in the second memory of the second functional unit 105, which is different from a memory region corresponding to the used-image-changing-unit information storage unit 108 in the second memory. FIG. 7B illustrates an example of a configuration of cutout processing information 701. In a scene ID 702, the same information (in this example, 123450) as that stored in the scene ID 201 illustrated FIG. 2 is stored. Cutout information 703 indicates a range of the second image deleted by the prior cutout processing. The example illustrated in FIG. 7B indicates that a range expressed by a numerical value 180 (any unit) from an upper end (T represents TOP) has been deleted. A format of the cutout information 703 is not limited to this example. For example, the cutout information 703 may indicate a range of the second image deleted by the prior cutout processing by using coordinates of the second image. It is only necessary that the cutout information 703 indicate a range that is left as an operation request image by the prior cutout processing or a range deleted from the operation request image.

The second functional unit 105, for example, stores the cutout processing information 701, output from the prior cutout processor 109F, in the cutout processing information storage unit 115 by using the second storage method. The second storage method is a method for encrypting the cutout processing information 701 by using the AES method using a block length of 128 bits (the second encryption method) and then storing the encrypted cutout processing information 701 in the cutout processing information storage unit 115.

Furthermore, the second functional unit 105 accesses the cutout processing information 701 corresponding to the encrypted data stored in the cutout processing information storage unit 115 by using the second access method.

The second access method is a method for obtaining the cutout processing information 701 by decrypting the encrypted cutout processing information 701 by using the second key data.

The second key data used for decryption of the encrypted cutout processing information 701 is stored in advance, for example, in the second memory managed by the second functional unit 105.

Note that the aforementioned threshold value information (the first threshold value, the second threshold value, the third threshold value, the fourth threshold value, and the like) may be preset information or may be, for example, information generated on the basis of data included in the distribution start command.

After completion of the image changing processing in the second image changing unit 109 in Step S105, the operation request image distributing unit 110A distributes the operation request image (FIG. 7A) and the corresponding scene ID (201 in FIG. 2) to at least one of the tagging operation terminal devices 103A through 103D over the network 102 (Step S106). The following describes an example in which the operation request image and the corresponding scene ID are distributed to the tagging operation terminal device 103A, but the same applies to cases where the operation request image and the corresponding scene ID are distributed to the tagging operation terminal devices 103B through 103D.

The tagging operation terminal device 103A includes, for example, an operation request image receiving unit 110, an image tag information generating unit 111, and an image tag information transmitting unit 112. Note that each of the tagging operation terminal devices 103B through 103D has a similar configuration.

First, the operation request image receiving unit 110 receives the operation request image and the corresponding scene ID (Step S107).

Figures 8, 9:
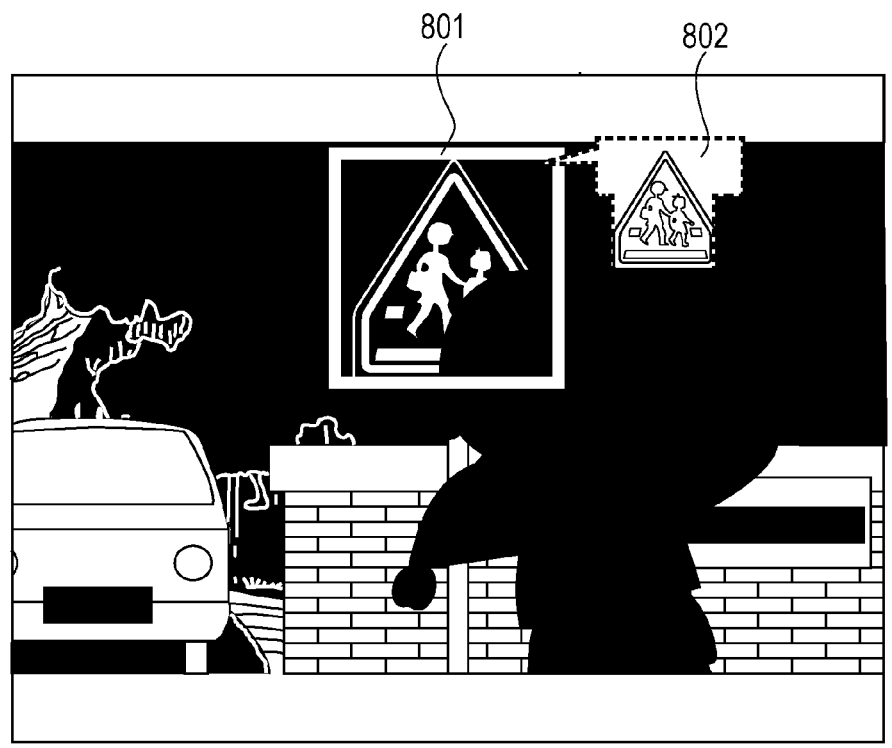
FIG. 8 is a diagram illustrating an example of a screen displayed for a tagging worker by an image tag information generating unit.
FIG. 9 is a diagram illustrating an example of a configuration of image tag information.

Next, the image tag information generating unit 111 provides, for example, a user interface illustrated in FIG. 8 to a tagging worker. The tagging worker looks at the operation request image and attaches a tag 802 to an image region 801. The image tagging device 101 may distribute tags of various kinds to the tagging operation terminal device 103A prior to the operation request or may distribute tags of various kinds to the tagging operation terminal device 103A at the same timing as Step S106.

In the present embodiment, the tag is an icon representing a road sign, but the tag may be a text string entered by the tagging worker by using a keyboard, a touch panel, or the like. After the tagging, image tag information 901 is generated on the basis of the image region 801 and the tag 802 (Step S108). FIG. 9 illustrates an example of a configuration of the image tag information 901. In a scene ID 902, information (123450 in this example) same as the scene ID 201 in FIG. 2 is stored. In rectangle information 903, coordinate information generated on the basis of the image region 801 in FIG. 8 is stored. In a tag ID 904, information generated on the basis of the tag 802 in FIG. 8 is stored.

Next, the image tag information transmitting unit 112 transmits the image tag information 901 to the image tagging device 101 as a response to the distributed operation request image (Step S109). In a case where the operation request image includes no image to be tagged, data indicating the absence of image tag information corresponding to the operation request image having the scene ID may be transmitted to the image tagging device 101.

Then, the image tag information receiving unit 113 receives the image tag information 901 (Step S110), and the image tag information 901 is stored in the image tag information storage unit 114 (Step S111). This completes the series of image tagging processing. The image tag information storage unit 114 is a region different from the region corresponding to the used-image-changing-unit information storage unit 108 and the region corresponding to cutout processing information storage unit 115 among regions of the second memory included in the second functional unit 105.

The second functional unit 105, for example, stores the image tag information 901 supplied from the image tag information receiving unit 113 in the image tag information storage unit 114 by using the second storage method. The second storage method is a method for encrypting the image tag information 901 by using the AES method using a block length of 128 bits (the second encryption method) and then storing the encrypted image tag information 901 in the image tag information storage unit 114.

The second functional unit 105 accesses the image tag information 901 corresponding to the encrypted data stored in the image tag information storage unit 114 by using the second access method.

The second access method is a method for obtaining the image tag information 901 by decrypting the encrypted image tag information 901 by using the second key data.

The second key data used to decrypt the encrypted image tag information 901 is, for example, stored in advance in the second memory managed by the second functional unit 105.

In the present embodiment, a sequential flow is illustrated in which the image tagging device 101 performs image changing processing on the master image 202, distributes an image to each of the tagging operation terminal devices 103A through 103D, and each of the tagging operation terminal devices 103A, 103B, 103C, and 103D transmits the image tag information 901 to the image tagging device 101 as a response to the received operation request image. Needless to say, however, it is also possible employ an arrangement in which a plurality of distributed images are processed in parallel, distributed to the tagging operation terminal devices 103A, 103B, 103C, and 103D all at once, and temporarily accumulated in the operation request image receiving units 110 of the respective tagging operation terminal devices 103A, 103B, 103C, and 103D. Furthermore, the image tag information transmitting unit 112 may collectively transmit plural pieces of image tag information 901 to the image tagging device 101 after a certain number of pieces of image tag information 901 is accumulated.

Figure 14:
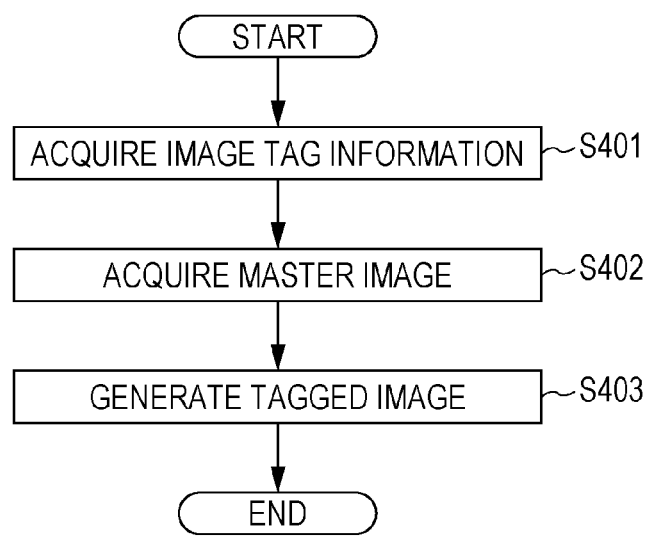
FIG. 14 is a flow chart illustrating tagged image generation in the tagged image generating unit.

FIG. 14 illustrates a flow in which a client side acquires a tagged image.

First, the tagged image generating unit 116 requests the second functional unit 105 to acquire image tag information (e.g., image tag information 901). The second functional unit 105, for example, accesses the image tag information 901 corresponding to the encrypted data stored in the image tag information storage unit 114 and the cutout processing information 701 corresponding to the encrypted data stored in the cutout processing information storage unit 115 in accordance with the second access method. Then the second functional unit 105 changes rectangle information 903 of the image tag information 901 to rectangle information applicable to the master image by using the cutout information 703 of the cutout processing information 701 and then supplies the image tag information 901 whose rectangle information 903 has been changed to the tagged image generating unit 116. This is because the origin of coordinate for the rectangle information 903 is not shared with the first functional unit 104. The tagged image generating unit 116 acquires the image tag information 901 supplied from the second functional unit 105 (Step S401). Next, the tagged image generating unit 116, for example, acquires the master image 202 by accessing the master image 202 corresponding to the encrypted data stored in the master image storage unit 106 in accordance with the first access method (Step S402). Since the tagged image generating unit 116 handles a master image which may include privacy information, it is desirable that the tagged image generating unit 116 be included in the first functional unit 104. Then, the tagged image generating unit 116 extracts, from the master image 202, image data corresponding to a region indicated by rectangle information 903 of the image tag information 901. Furthermore, the tagged image generating unit 116 generates a tagged image in which the extracted image data of the region and the tag ID 904 are associated with each other (Step S403). The generated tagged image is stored in the first memory by using the first storage method.

Figures 10A, 10B:
FIG. 10A is a diagram illustrating an example of image data of a tagged image generated by a tagged image generating unit.
FIG. 10B is a diagram illustrating an example of a tagged image generated by the tagged image generating unit.

FIG. 10A illustrates an example of the image data of the tagged image generated by the tagged image generating unit 116, and FIG. 10B illustrates an example of the generated tagged image. Note that an identifier used for acquisition of the image tag information by the tagged image generating unit 116 is the scene ID 902 or the tag ID 904. Accordingly, the number of pieces of acquired image tag information is not limited to 1 and can be more than 1. In this case, the tagged image generating unit 116 need just extract, from the master image 202, image data corresponding to regions indicated by pieces of rectangle information indicated by the respective pieces of image tag information and then generate tagged images in which the extracted image data of the respective regions and corresponding tag IDs are associated with each other.

As described above, according to the present embodiment, a client transmits, as an operation request image, an image obtained by performing image changing processing on a human and an object that is not to be tagged to the tagging operation terminal devices 103A through 103D.

This allows a tagging worker to more easily find an object to be recognized in the operation request image.

Accordingly, the tagging worker can more easily performs an operation of cutting out an image region to be tagged from the operation request image and then tagging the image region. This makes it possible to achieve an improvement in efficiency of the worker's tagging operation in addition to protection of privacy of a person in the operation request image. Furthermore, the first storage method and the first access method used by the first functional unit 104 that performs processing whose privacy level is high have higher security strength than the second storage method and the second access method used by the second functional unit.

That is, processing load on a server (the image tagging device 101) is reduced by not employing methods having uniformly high security strength for all processing, but employing methods with necessary security strength according to respective processing.

In the above description, an example in which the first image changing unit 107, especially the text image changer 107C performs image changing processing on text information has been described, but the present embodiment is not limited to this.

The text information has been subjected to image changing processing since there is a possibility that, for example, a place where the image was taken is specified from the text information.

However, in a case where text information in an image is information that is not related to a place, such text information need not necessarily be subjected to image changing processing.

For example, it is possible to employ an arrangement in which information (place name dictionary information) concerning names (also referred to as place names) such as prefectures, cities, towns, and villages is accumulated in advance in a memory (not illustrated) of the image tagging device 101, and in a case where text information in an image includes information concerning a place name, image changing processing is performed, whereas in a case where text information in an image includes no information concerning a place name, image changing processing is not performed.

With the arrangement, it can be expected that a period required to paint out text information that has low relevance with privacy information included in a master image is saved, and therefore a reduction of a period required to generate a first image can be expected.

In the description of the embodiment, the second functional unit 105 access the image tag information 901 and the cutout processing information 701 to change the rectangle information 903 after the second functional unit 105 receives a request to obtain the image tag information 901 from the tagged image generating unit 116.

However, the second functional unit 105 may access the cutout processing information 701 to change the rectangle information 903 included in the image tag information 901 before the image tag information 901, received from the image tag information receiving unit 113, is stored in the image tag information storage unit 114.

With the arrangement, the second functional unit 105 can respond faster to the request to obtain the image tag information 901 from the tagged image generating unit 116 and output the image tag information 901 to the tagged image generating unit 116.

A reason why the car and the wall that are located away from the road sign in the operation request image illustrated in FIG. 7A are not blackened out is that the second functional unit 105 does not include changers for detecting the car and the wall or that the setting information stored in the used-image-changing-unit information storage unit 108 does not include information of the car and the wall.

Needless to say, in a case where the second image changing unit includes changers that detect the car or the wall in the first image and change images of the detected regions, the car or the wall in FIG. 7A are blackened out.

In the above embodiment, constituent elements of the image tagging device 101 may be realized by special hardware that realizes the functions of the constituent elements.

In the above embodiment, the functions of the constituent elements of the image tagging device 101 may be realized in a manner such that the image tagging device 101 has a recording medium such as a hard disc or a semiconductor memory on which software programs corresponding to the respective constituent elements are recorded, and the software programs are executed by a program executing unit such as a CPU or a processor included in the image tagging device 101.

The functions of the constituent elements of the image tagging device 101 may be realized in a manner such that any of the constituent elements of the image tagging device 101 is realized by special hardware, and software programs corresponding to remaining constituent elements are recorded on a recording medium and executed by a program executing unit.

Data used for realization of the functions of the constituent elements of the image tagging device 101 may be recorded on a recording medium such as a hard disc or a semiconductor memory. The recording medium on which the data is recorded may be included in the image tagging device 101 or may be provided outside the image tagging device 101. That is, it is only necessary that the recording medium on which the data is recorded is accessible in realization of the functions of the constituent elements of the image tagging device 101.

The same applies to the constituent elements of each of the tagging operation terminal devices 103A through 103D.

The technique described in the above embodiment can be, for example, realized in the following cloud service types. However, the type of cloud service in which the technique described in the above embodiment is realized is not limited to these types.

Service Type 1: In-House Data Center Type Cloud Service

Figure 16:
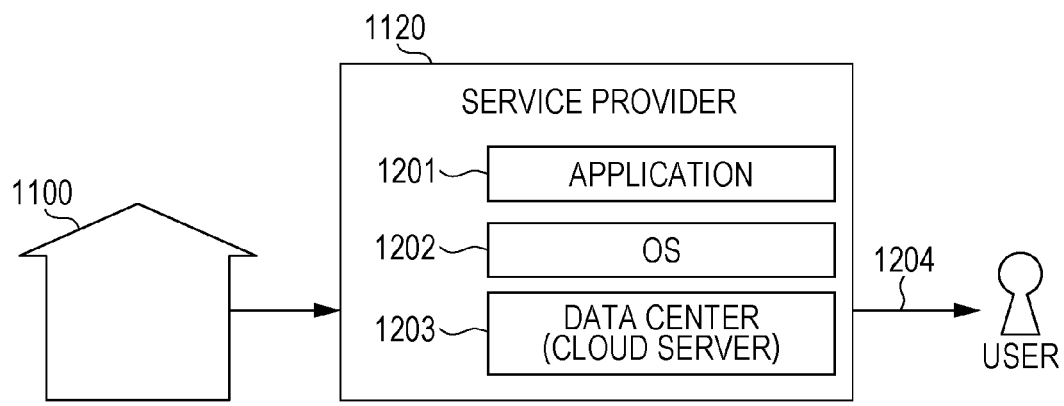
FIG. 16 is a diagram illustrating the whole picture of service provided by an information management system in Service Type 1 (In-House Data Center Type Cloud Service)

FIG. 16 is a diagram illustrating the whole picture of service provided by an information management system in Service Type 1 (In-House Data Center Type Cloud Service). In this type, the service provider 1120 acquires information from the group 1100 and provides service to a user. In this type, the service provider 1120 has a function of a data center management company. That is, the service provider 1120 has the cloud server 1111 that manages big data. Therefore, there is no data center management company.

In this type, the service provider 1120 runs and manages a data center (cloud server) 1203. Furthermore, the service provider 1120 manages an operating system (OS) 1202 and an application 1201. The service provider 1120 provides the service by using the OS 1202 and the application 1201 managed in the service provider 1120 (arrow 1204).

Service Type 2: IaaS Type Cloud Service

Figure 17:
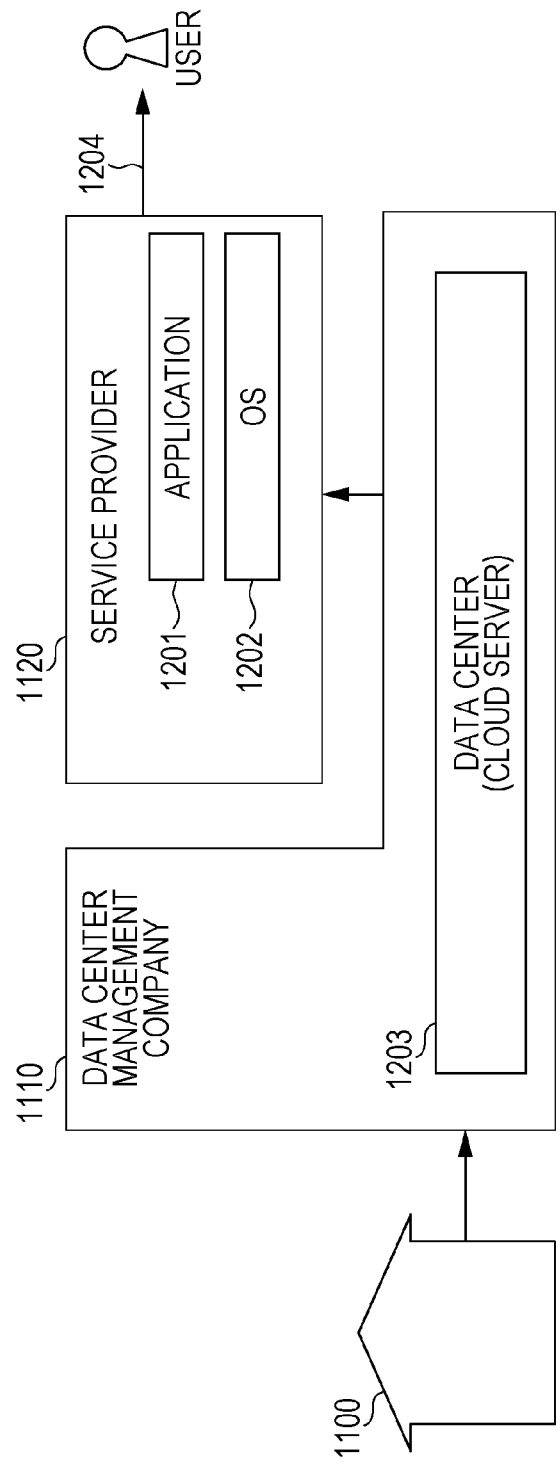
FIG. 17 is a diagram illustrating the whole picture of service provided by an information management system in Service Type 2 (IaaS Type Cloud Service)

FIG. 17 is a diagram illustrating the whole picture of service provided by an information management system in Service Type 2 (IaaS Type Cloud Service). IaaS is an abbreviation of Infrastructure as a Service and is a cloud service providing model that provides an infrastructure itself for construction and operation of a computer system as a service over the Internet.

In this type, a data center management company 1110 runs and manages a data center (cloud server) 1203. Furthermore, the service provider 1120 manages an OS 1202 and an application 1201. The service provider 1120 provides the service by using the OS 1202 and the application 1201 managed by the service provider 1120 (arrow 1204).

Service Type 3: PaaS Type Cloud Service

Figure 18:
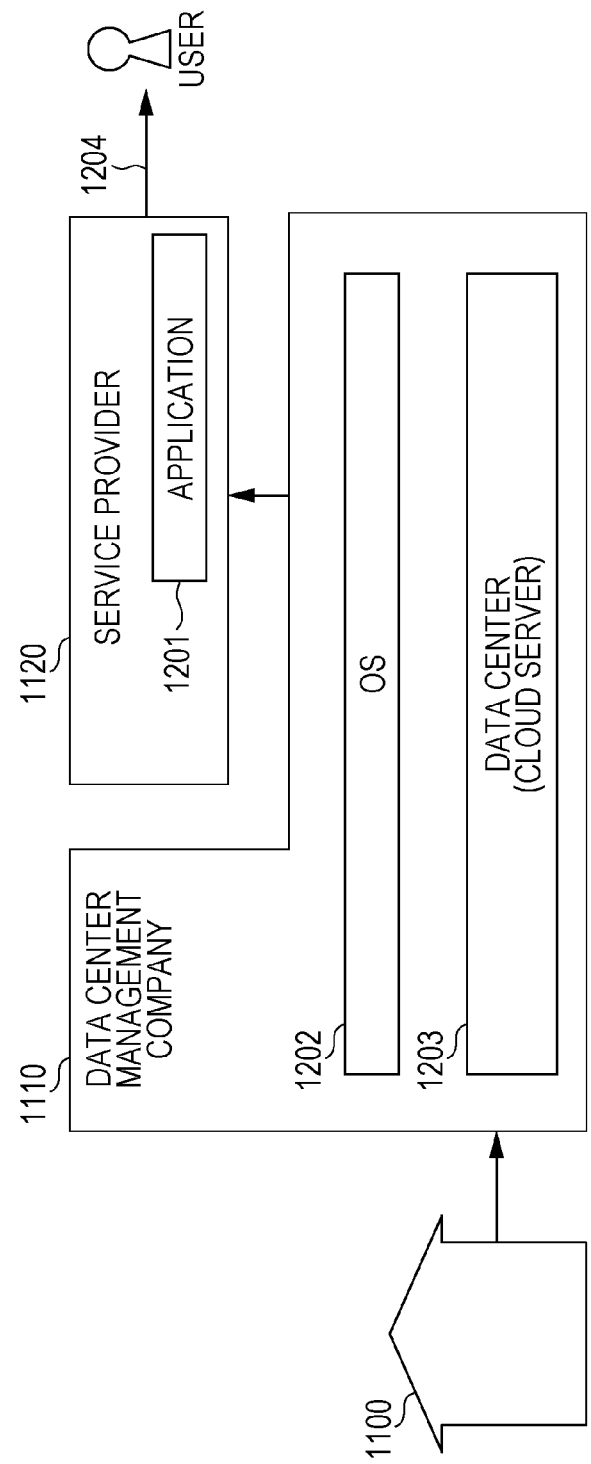
FIG. 18 is a diagram illustrating the whole picture of service provided by an information management system in Service Type 3 (PaaS Type Cloud Service)

FIG. 18 is a diagram illustrating the whole picture of service provided by an information management system in Service Type 3 (PaaS Type Cloud Service). PaaS is an abbreviation of Platform as a Service and is a cloud service providing model that provides a platform for construction and operation of software as a service over the Internet.

In this type, the data center management company 1110 manages an OS 1202 and runs and manages a data center (cloud server) 1203. Furthermore, the service provider 1120 manages an application 1201. The service provider 1120 provides the service by using the OS 1202 managed by the data center management company 1110 and the application 1201 managed by the service provider 1120 (arrow 1204).

Service Type 4: SaaS Type Cloud Service

Figure 19:
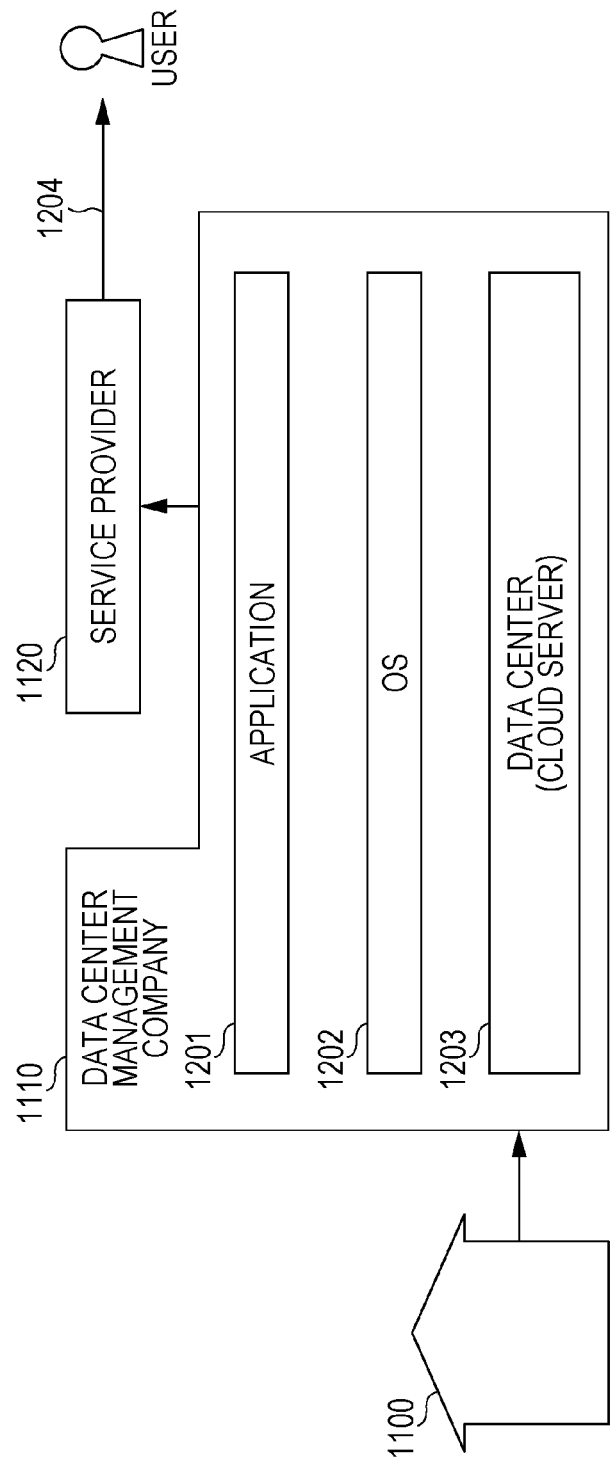
FIG. 19 is a diagram illustrating the whole picture of service provided by an information management system in Service Type 4 (SaaS Type Cloud Service).

FIG. 19 is a diagram illustrating the whole picture of service provided by an information management system in Service Type 4 (SaaS Type Cloud Service). SaaS is an abbreviation of Software as a Service. For example, the SaaS type cloud service is a cloud service providing model that allows a user such as a company or an individual that does not have a data center (cloud server) to use an application provided by a platform provider that has a data center (a cloud server) over a network such as the Internet.

In this type, the data center management company 1110 manages an application 1201 and an OS 1202 and runs and manages a data center (cloud server) 1203. The service provider 1120 provides service by using the OS 1202 and the application 1201 managed by the data center management company 1110 (arrow 1204).

In any of the cloud service types described above, the service provider 1120 provides service. For example, the service provider or the data center management company may develop an OS, an application, a database for big data, or the like by itself or may outsource development of an OS, an application, a database for big data, or the like to a third party.

The present disclosure is applicable to an image tagging device, especially to an image tagging device used in a case where tagging service is implemented (provided) in crowd-sourcing or the like.

What is claimed is:

1. An image tagging device comprising:
    a processor, and
    a storage that stores instructions that, when executed by the processor, cause the processor to execute:
    generating a first image by changing a first region image corresponding to a first object related to privacy information in a master image stored in a first memory and thereby removing the privacy information included in the master image;
    generating an operation request image by changing a second region image corresponding to a second object that is not to be tagged in the first image;
    distributing the generated operation request image to a tagging operation terminal device over a network;
    receiving image tag information, as a response to the distributed operation request image, from the tagging operation terminal device over the network; and
    generating a tagged image on the basis of the master image and the image tag information,
    wherein the operation request image with removed privacy information and removed second object information is distributed to the tagging operation terminal device to increase privacy of information being transmitted over the network, and to increase efficiency of the tagging operation terminal device due to reduced information to be processed in a tagging operation.

2. The image tagging device according to claim 1, wherein
    the image tagging device further includes a second memory;
    the instructions further cause the processor to executes storing the received image tag information in the second memory; and
    in the acquiring of the generated first image, the tagged image is generated on the basis of the master image and the image tag information stored in the second memory to the tagged image generator.

3. The image tagging device according to claim 2, wherein
    the instructions further cause the processor to executes:
    storing the master image in the first memory by using a first storage method;
    storing the image tag information in the second memory by using a second storage method; and
    the first storage method and the second storage method are different from each other.

4. The image tagging device according to claim 3, wherein
    the first storage method has security strength higher than the second storage method.

5. The image tagging device according to claim 4, wherein
    the first storage method is a method for encrypting the master image by using a first encryption algorithm and then storing the encrypted master image in the first memory; and
    the second storage method is a method for encrypting the image tag information by using a second encryption algorithm and then storing the encrypted image tag information in the second memory.

6. The image tagging device according to claim 5, wherein
    the instructions further cause the processor to executes:
    decrypting the encrypted master image by using first key data;
    decrypting the encrypted image tag information by using second key data; and
    a bit length of the first key data is longer than that of the second key data.

7. The image tagging device according to claim 2, wherein
    a first access method by which the master image stored in the first memory is accessed is different from a second access method by which the tagged image stored in the second memory is accessed.

8. The image tagging device according to claim 7, wherein
    the first access method has security strength higher than the second access method.

9. The image tagging device according to claim 7, wherein at least one of a memory region and an amount of computation that are necessary for access in the first access method is larger than that in the second access method.

10. The image tagging device according to claim 1, wherein
the generating of the first image further includes detecting the first object in the master image,
the first image is generated by changing the first region image corresponding to the detected first object,
the generating of the operation request image further includes detecting the second object in the first image, and
the operation request image is generated by changing the second region image corresponding to the detected second object.

11. The image tagging device according to claim 10, wherein
the generating of the first image further includes (i) detecting, as the first object, a human in the master image, (ii) detecting, as the first object, a license number of a vehicle in the master image, or (iii) detecting, as the first object, a text in the master image; and
the first image is generated by changing the first region image corresponding to the detected first object in the master image.

12. The image tagging device according to claim 10, wherein
the generating of the operation request image further includes (i) detecting, as the second object, sky in the first image, (ii) detecting, as the second object, a road in the first image, (iii) detecting, as the second object, a plant in the first image, or (iv) detecting, as the second object, a landmark including a building in the first image; and
the operation request image is generated by changing the second region image corresponding to the detected second object in the first image.

13. The image tagging device according to claim 1, wherein
the first object includes different kinds of objects,
the generating of the first image further includes detecting the different kinds of objects in the master image, and
the first image is generated by changing images of regions corresponding to the detected different kinds of objects.

14. The image tagging device according to claim 1, wherein
the second object includes different kinds of objects,
the generating of the operation request image further includes detecting the different kinds of objects in the first image, and
the operation request image is generated by changing images of regions corresponding to the detected different kinds of objects.

15. The image tagging device according to claim 1, wherein
the generating of the first image further includes detecting, as the first object, an object that is preset as an object that requires privacy protection in the master image, and
the first image is generated by changing the first region image corresponding to the detected first object in the master image.

16. The image tagging device according to claim 15, wherein
the generating of the operation request image further includes detecting, as the second object, an object that is preset as an object that is not to be tagged in the first image, and
the operation request image is generated by changing the second region image corresponding to the detected second object in the first image.

17. The image tagging device according to claim 16, wherein
the operation request image is generated by further changing an image of a region of a portion that satisfies a predetermined condition among region images that are different from the first region image and the second region image in the first image in which the second region image has been changed by the changing of the second region image corresponding to the detected second object in the first image.

18. The image tagging device according to claim 17, wherein
the generating of the operation request image further includes:
computing an area of a region image that is different from the first region image and the second region image in the first image in which the second region image has been changed by the changing of the second region image corresponding to the detected second object in the first image; and
setting, as the operation request image, a rectangular image including the region image in a case where the area of the region image is equal to or larger than a threshold value.

19. An image tagging method, comprising:
generating, using a processor, a first image by changing a first region image corresponding to a first object related to privacy information in a master image stored in a first memory of the image tagging device and thereby removing the privacy information included in the master image;
generating, using the processor, an operation request image by acquiring the generated first image and changing a second region image corresponding to a second object that is not to be tagged in the first image;
distributing, using the processor, the generated operation request image to a tagging operation terminal device over a network;
receiving, using the processor, image tag information, as a response to the distributed operation request image, from the tagging operation terminal device over the network; and
generating, using the processor, a tagged image on the basis of the master image and the image tag information,
wherein the operation request image with removed privacy information and removed second object information is distributed to the tagging operation terminal device to increase privacy of information being transmitted over the network, and to increase efficiency of the tagging operation terminal device due to reduced information to be processed in a tagging operation.

* * * * *